(12) United States Patent  
Kim

(10) Patent No.: US 6,262,883 B1  
(45) Date of Patent: Jul. 17, 2001

(54) PORTABLE COMPUTER

(75) Inventor: Hae-Soo Kim, Suwon (KR)

(73) Assignee: SamSung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/395,169

(22) Filed: Sep. 14, 1999

(30) Foreign Application Priority Data

Sep. 14, 1998 (KR) .................................................. 98-37831

(51) Int. Cl.⁷ ....................................................... G06F 1/16
(52) U.S. Cl. ......................... 361/680; 361/679; 361/681; 361/682; 361/683; 361/684; 361/685; 361/686
(58) Field of Search .................................... 361/679–686

(56) References Cited

U.S. PATENT DOCUMENTS

| | | |
|---|---|---|
| 5,463,527 | 10/1995 | Hager et al. . |
| 5,481,431 | 1/1996 | Siahpolo et al. . |
| 5,485,348 | 1/1996 | Oros . |
| 5,510,955 | 4/1996 | Taesang . |
| 5,515,237 | 5/1996 | Ogami et al. . |
| 5,526,226 | 6/1996 | Katoh et al. . |
| 5,564,804 | 10/1996 | Gonzalez et al. . |
| 5,587,879 | 12/1996 | Spano et al. . |
| 5,595,501 | 1/1997 | Ho . |
| 5,599,080 | 2/1997 | Ho . |
| 5,668,697 | 9/1997 | Dowdy . |
| 5,680,293 | 10/1997 | McAnally et al. . |
| 5,683,159 | 11/1997 | Johnson . |
| 5,768,099 | 6/1998 | Radloff et al. . |
| 5,788,211 | 8/1998 | Astier . |
| 5,806,949 | 9/1998 | Johnson . |
| 5,828,547 | 10/1998 | Francovich et al. . |
| 5,921,644 | 7/1999 | Brunel et al. . |
| 5,943,208 | 8/1999 | Kato et al. . |

*Primary Examiner*—Leo P. Picard  
*Assistant Examiner*—Yean-Hsi Chang  
(74) *Attorney, Agent, or Firm*—Robert E. Bushnell, Esq.

(57) ABSTRACT

A portable computer provided with a structure for mounting an auxiliary device with a front having a board connector and two opposite sides having symmetrical screw holes, including: a housing having a bottom, upper surface and internal space; a printed circuit board (PCB) mounted on the bottom of the housing having a device connector for connecting to the auxiliary device; a keyboard assembly detachably attached to the housing; a keyboard seat formed on the upper surface of the housing to mount the keyboard assembly, the keyboard seat having an opening for enabling the auxiliary device to be mounted on the bottom in the internal space of the housing with the board connector connected to the device connector, and a bracket having two end support parts and an upper support plate for fixedly attaching the auxiliary device to the bottom of the housing, one of the two end support parts being pivotably attached to the sides of the auxiliary device and the other end supported by an internal structure of the housing, and the upper support part being positioned parallel to the keyboard seat so as to be held by the keyboard assembly, thereby mounting the auxiliary device in the housing without using any screws.

6 Claims, 9 Drawing Sheets

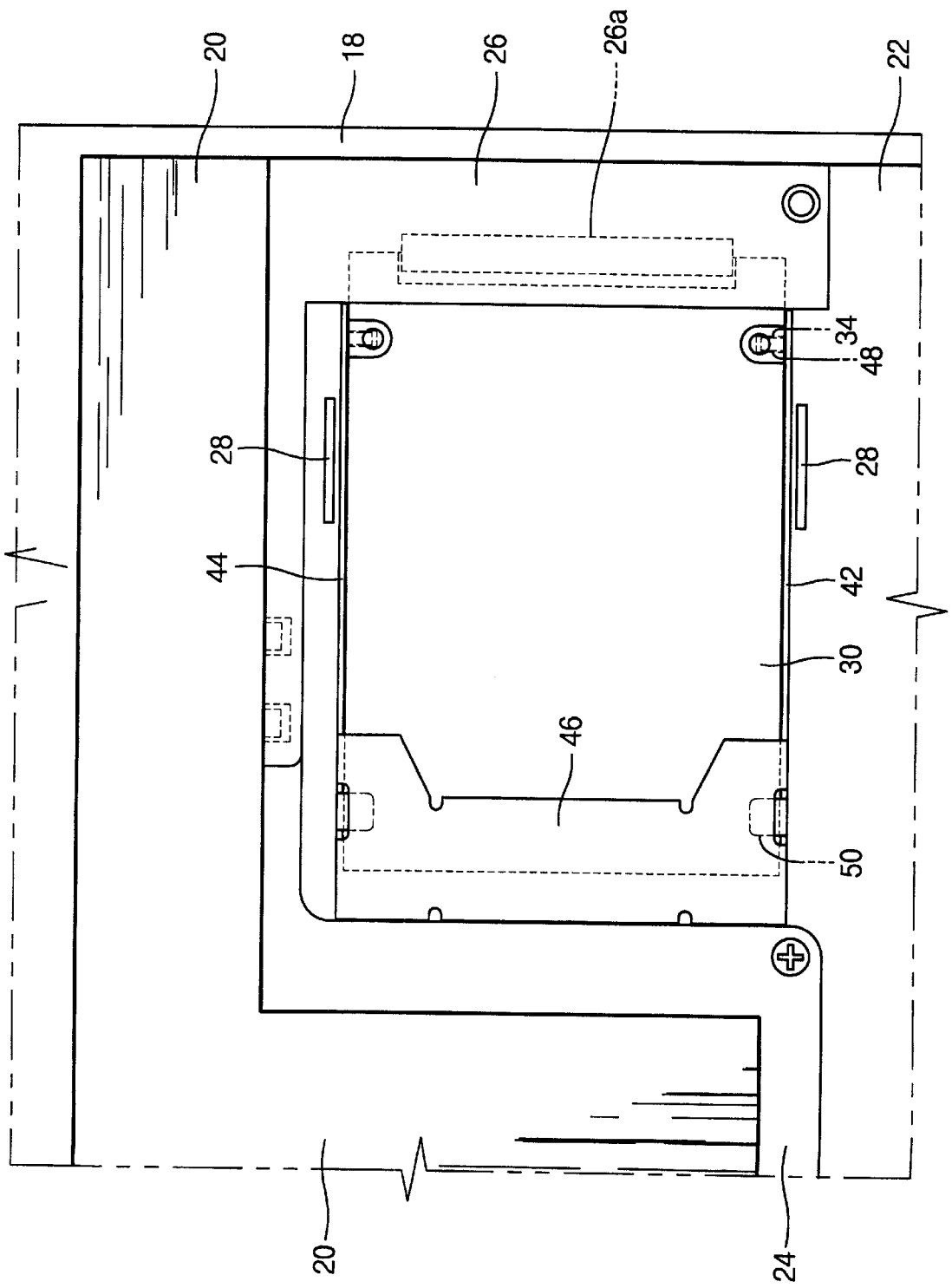

PORTABLE COMPUTER

CLAIM OF PRIORITY

This application makes reference to, incorporates the same herein, and claims all benefits accruing under 35 U.S.C. §119 from my application PORTABLE COMPUTER filed with the Korean Industrial Property Office on Sep. 14, 1998 and there duly assigned Ser. No. 37831/1998.

BACKGROUND OF THE INVENTION

1. Field of the Invention

The present invention concerns a portable computer, and more particularly a structure for mounting an auxiliary device in a portable computer.

2. Related Art

The physical structure of a portable computer such as notebook is considerably different from that of a desk top computer to allow for its portability. A conventional portable computer comprises a system body and display panel. The housing of the system body is provided with a keyboard assembly. Mounted in the housing is a motherboard connected to an audio board. A hard disk drive is also mounted in the housing as an auxiliary device. A bracket is used to mount the hard disk drive. To this end, the bracket is attached to the hard disk drive by means of screws connected to two opposite sides of the hard disk drive. The bracket is finally fixed to the bottom of the housing by means of screws connected to bosses. Thus, many screws are required to mount the hard disk drive in the conventional portable computer. Four screws are necessary for attaching the bracket to the hard disk drive, and an additional two screws and needed for fixing the bracket to the bosses. This makes it very inconvenient to insert or remove the hard disk drive.

The following patents each discloses features in common with the present invention: U.S. Pat. No. 5,828,547 to Francovich et al., entitled COMPUTER CASE HAVING SLIDABLY INSERTABLE DRIVEHOUSING WITH U-SHAPED MOUNTING BRACKET HAVING INWARDLY PROJECTING PAINS ON TWO OPPOSED LEGS, issue don Oct. 27, 1998, U.S. Pat. No. 5,806,949 to Johnson, entitled HARDWARE MOUNTING RAIL, issued on Sep. 15,1998, U.S. Pat. No. 5,683,159 to Johnson, entitled HARD WARE MOUNTING RAIL, issued on Nov. 4, 1997, U.S. Pat. No. 5,463,527 to Hager et al., entitled SUSPENSION SYSTEM FOR DISK DRIVES UTILIZING SHEAR LOADED ELASTOMERIC SUPPORTS OF DIFFERENT DUROMETER HARDNESSES AND ELASTOMERIC PADS, issued on Oct. 31, 1995, U.S. Pat. No. 5,481,431 to Siahpolo etal., entitled SYSTEMHA VING U-SHAPED ACTUATOR AND HANDLE WITH CAM SURFACES FOR MOUNTING COMPUTER HARD DRIVE OR THE LIKE, issued on Jan. 2, 1996, U.S. Pat. No. 5,485,348 to Oros, entitled MOUNTING ASSEMBLY FOR COMPUTER FLOPPY DRIVER REQUIRING NO TOOL FOR REMOVAL FROM COMPUTER, issued on Jan. 16, 1996, U.S. Pat. No. 5,510,955 to Taesang, entitled CAGE IN COMPUTER EOUIPMENT FOR LOCKING PERIPHERAL EQUIPMENT THEREWITHIN USING HOOKED LOCKPINS, issued on Apr. 23, 1996, U.S. Pat. No. 5,515, 237 to Ogami et al., entitled PORTABLE ELECTRONIC APPARATUS HAVING REMOVABLE HARD DISK DRIVE INCLUDING AN EXTERNALLY OPERABLE LOCK MEMBER, issued on May 7,1996, U.S. Pat. No. 5,526,226 to Katoh etal., entitled INFORMATION PROCESSING APPARATUS AND DEVICE ACCOMMODATED THEREIN WITH MECHANISM FOR LOCKING A COVER, issued on Jun. 11, 1996, U.S. Pat. No. 5,564,804 to Gonzalez etal., entitled DISK DRIVE BRACKET, issued on Oct. 15, 1996, U.S. Pat. No. 5,587,879 to Spano et al., entitled MOUNTING ARRANGEMENT FOR COMPUTER HARDWARE COMPONENTS AND METHOD, issued on Dec. 24, 1996, U.S. Pat. No. 5,595,501 to Ho, entitled SLIDING CASE MOUNTING DEVICE, issued on Jan. 21, 1997, U.S. Pat. No. 5,599,080 to Ho, entitled SLIDING CASE MOUNTING DEVICE, issued on Feb. 4, 1997, U.S. Pat .No. 5,668,697 to Dowdy, entitled DATA STORAGE MODULE HAVING CRADLES ON HOUSING AND ELASTOMERIC MEMBER MOUNTED ON DATA STORAGE MECHANISM, issued on Sep. 16, 1997, U.S. Pat. No. 5,680,293 to McAnally et al., entitled SCREWLESS HARD DRIVE MOUNTING IN A COMPUTER SYSTEM WITH A CHASSIS VIA A FIRST BRACKET RIGIDLY MOUNTED TO THE CHASSIS AND A SECOND BRACKET MOVABLY MOUNTED TO THE CHASSIS, issued on Oct. 21, 1997, U.S. Pat. No. 5,768,099 to Radloffetal., entitled COMPUTER WITH AN IMPROVED DISK DRIVE MOUNTING ASSEMBLY, issued on Jun. 16, 1998, U.S. Pat. No. 5,788,211 to Astier, entitled FIXING PIECE FOR DATA STORAGE DRIVE AND OTHER UNITS, issued on Aug. 4, 1998, U.S. Pat. No. 5,921,644 to Brunel et al., entitled MOUNTING ARRANGEMENT FOR MOUNTING EITHER OF TWO DIFFERENTLY-SIZED SUBSYSTEM UNITS, issued on Jul. 13, 1999, and U.S. Pat. No. 5,943,208 to Kato et al., entitled TERMINAL DEVICE AND MEMORY DEVICE-FASTENING MECHANISM, issued on Aug. 24, 1999.

SUMMARY OF THE INVENTION

It is an object of the present invention to provide a portable computer with a structure for mounting an auxiliary device in the housing without using any screws.

According to an embodiment of the present invention, a portable computer provided with a structure for mounting an auxiliary device with a front having a board connector and two opposite sides having symmetrical screw holes, comprises: a housing having a bottom, upper surface and internal space; a printed circuit board (PCB) mounted on the bottom of the housing and having a device connector for connecting to the auxiliary device; a keyboard assembly detachably attached to the housing; a keyboard seat formed on the upper surface of the housing to mount the keyboard assembly, the keyboard seat having an opening for enabling the auxiliary device to be mounted on the bottom in the internal space of the housing with the board connector connected to the device connector, and a bracket having two end support parts and an upper support plate for fixedly attaching the auxiliary device to the bottom of the housing, one of the two end support parts being pivotably attached to the sides of the auxiliary device with the other end support part being supported by an internal structure of the housing, and the upper support part being positioned parallel with the keyboard seat so as to be held by the keyboard assembly, thereby mounting the auxiliary device in the housing without using any screws.

Preferably, the bracket includes a pair of strips each having a free end for respectively supporting the two opposite sides of the auxiliary device, a pair of pins respectively and symmetrically formed on the free ends of the strips so as to be pivotably inserted into the screw holes of the two opposite sides of the auxiliary device, the upper support plate being formed by extending the other ends of the strips, and protuberances formed on the strips so as to support the upper surface of the auxiliary device. The pair of strips are made of a resilient material for causing the pins to be tightly inserted into the screw holes. The bracket further includes a cam part formed on the free end of each of the strips to cause the bracket to be pushed backwards by being pressed onto the PCB and thus separate the board connector of the auxiliary device from the device connector of the PCB when the bracket is pivoted to detach the auxiliary device from the PCB. The internal structure of the housing may be the PCB or a boss formed in the housing.

The present invention will now described more specifically with reference to the drawings attached only by way of example.

BRIEF DESCRIPTION OF THE DRAWINGS

FIG. 7 is a partial plane view illustrating the hard disk drive mounted in the housing of a portable computer according to the present invention.

DETAILED DESCRIPTION OF THE PREFERRED EMBODIMENTS

Figure 1:
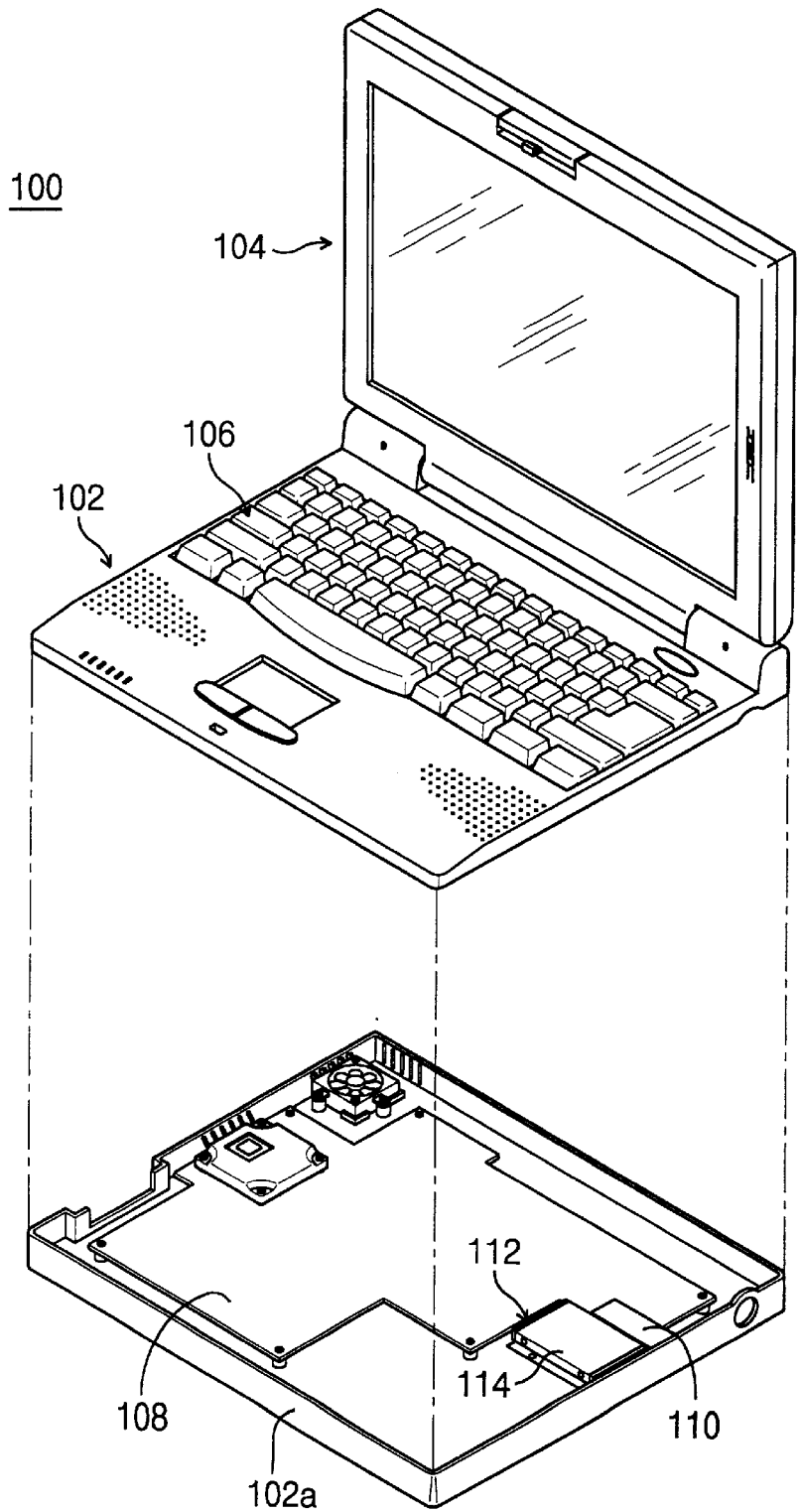
FIG. 1 is a perspective view illustrating a conventional portable computer.
Figure 2:
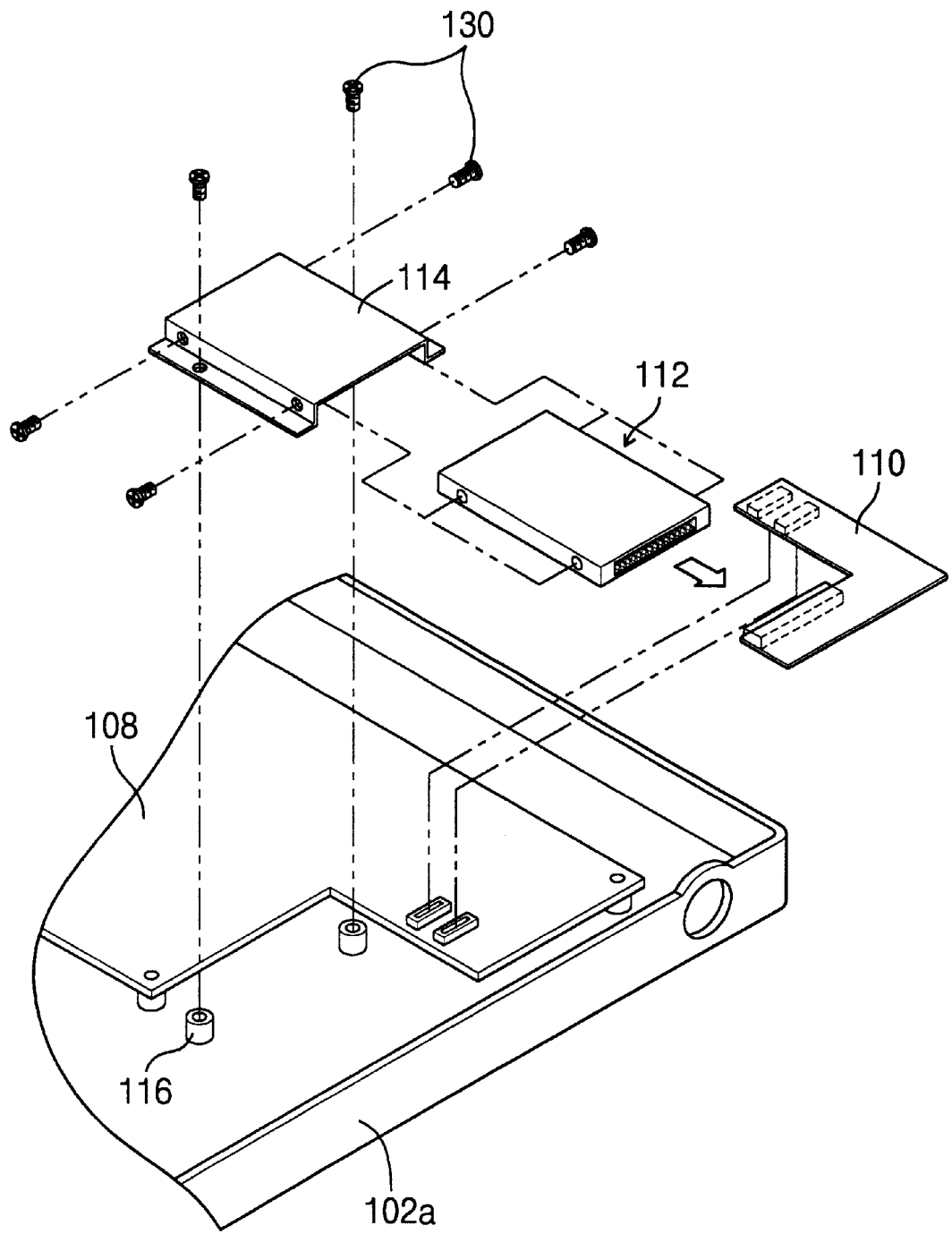
FIG. 2 is a partially exploded view illustrating the conventional structure for mounting a hard disk drive in the housing of a portable computer.

Referring to FIGS. 1 and 2, a conventional portable computer 100 comprises a system body 102 and display panel 104. The housing of the system body 102 is provided with a keyboard assembly 106. Mounted in the housing is a motherboard 108 connected to an audio board 110. A hard disk drive 112 is also mounted in the housing as an auxiliary device. A bracket 114 is used to mount the hard disk drive 112. To this end, the bracket 114 is attached to the hard disk drive 112 by means of screws 130 connected to two opposite sides of the hard disk drive. The bracket 114 is finally fixed to the bottom of the housing by means of the screws 130 connectedto bosses 116. Thus, many screws 130 are required to mount the hard disk drive in the conventional portable computer. Four screws are necessary for attaching the bracket 114 to the hard disk drive 112, and additional two screws are needed for fixing the bracket 114 to the bosses 116. This makes it very inconvenient to insert or remove the hard disk drive.

The same reference numerals are used to represent the same flnctional parts throughout the attached drawings for descriptive convenience.

Figure 3:
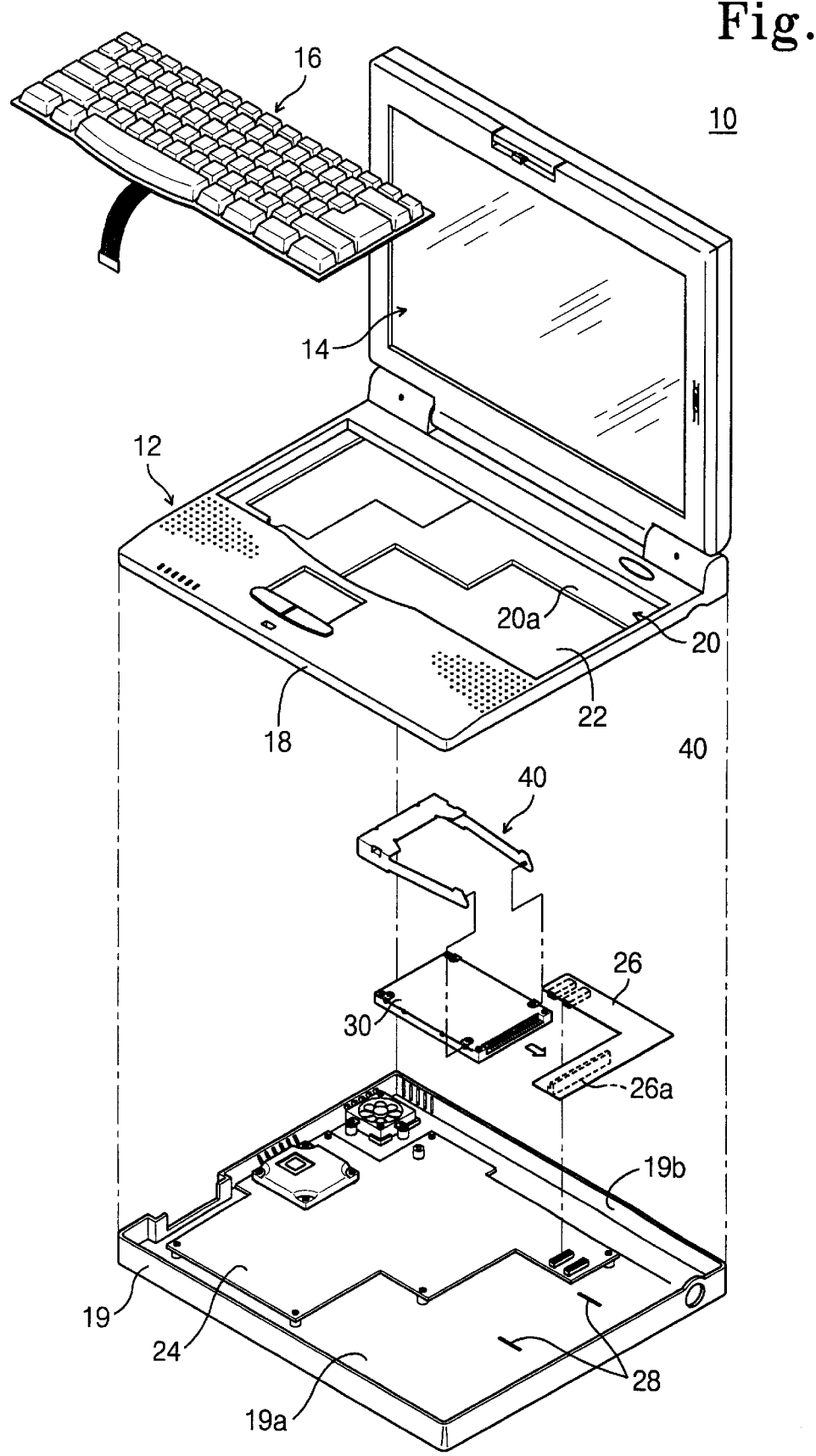
FIG. 3 is an exploded perspective view illustrating the inventive structure for mounting a hard disk drive in a portable computer.

Referring to FIG. 3, a portable computer 10 such as notebook computer comprises a system body 12 connected to a display panel 14 by means of a hinge mechanism to make them foldable. The housing of the system body 12 consists of a bottom housing part 19 and top housing part 18. The bottom housing part 19 includes a bottom 19a and side walls 19b. The top housing part 18 is mounted over the bottom housing part 19 to form an internal space in the system body. Provided on the top housing part 18 is a keyboard seat 20 for detachably mounting a keyboard assembly 16. The keyboard seat 20 is also provided with an opening 22 communicating with the internal space of the system body 12. The hard disk drive may be mounted in the housing through the opening 22.

Also mounted in the housing are a motherboard 24, audio board 26, and a plurality of electronic card assemblies. A hard disk drive 30 is fixedly mounted in the housing as an auxiliary device by means of a bracket 40 pivotably connected to the auxiliary device. A pair of guide ribs 28 are arranged in the bottom of the bottom housing part 19 to guide the sliding of the hard disk drive 30. The audio board 26 is provided with a device connector 26a connected to the hard disk drive 30. The audio board 26 is connected to the motherboard 24, fixed on the bottom 19a of the housing.

Figure 4:
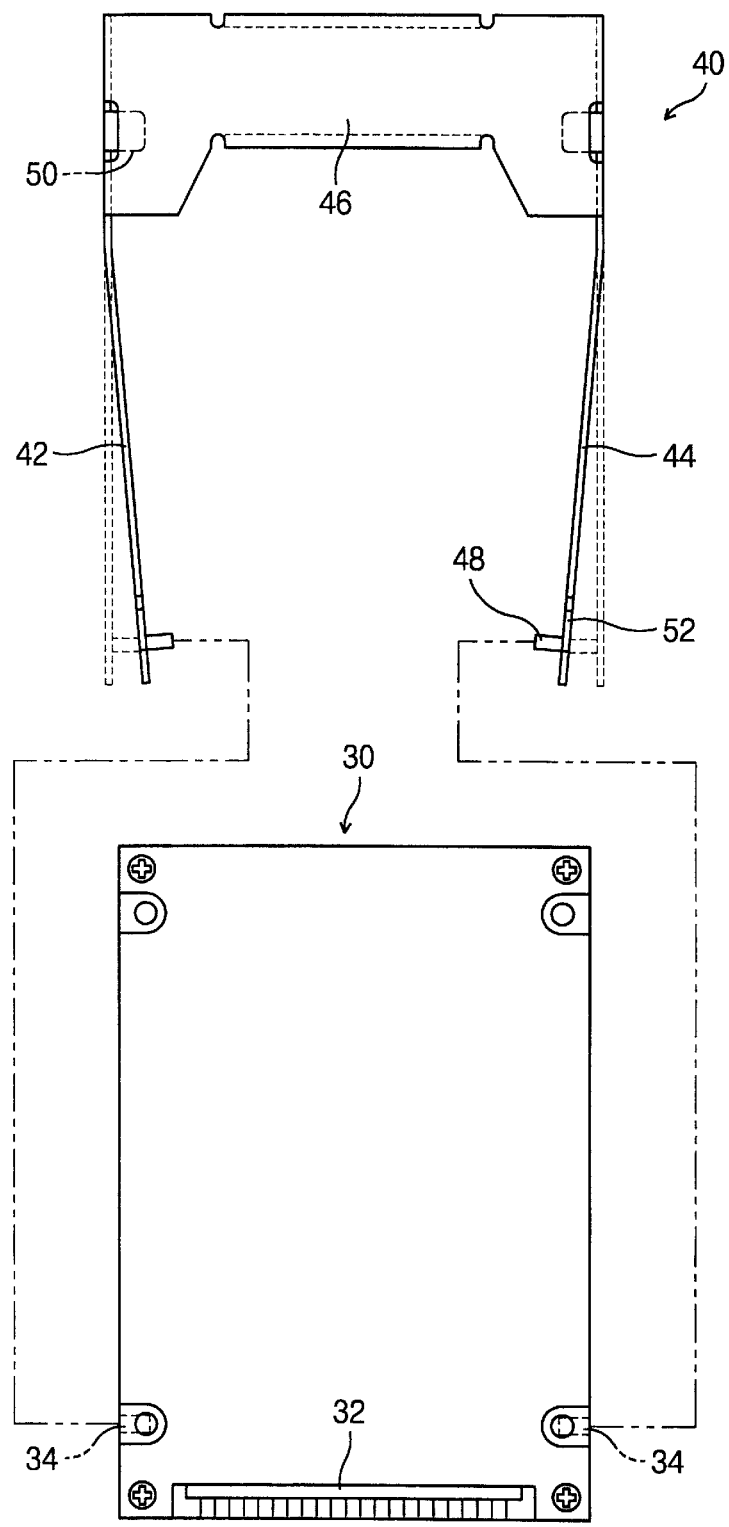
FIG. 4 is a plane view illustrating the bracket and hard disk drive as shown in FIG. 3.
Figure 5A:
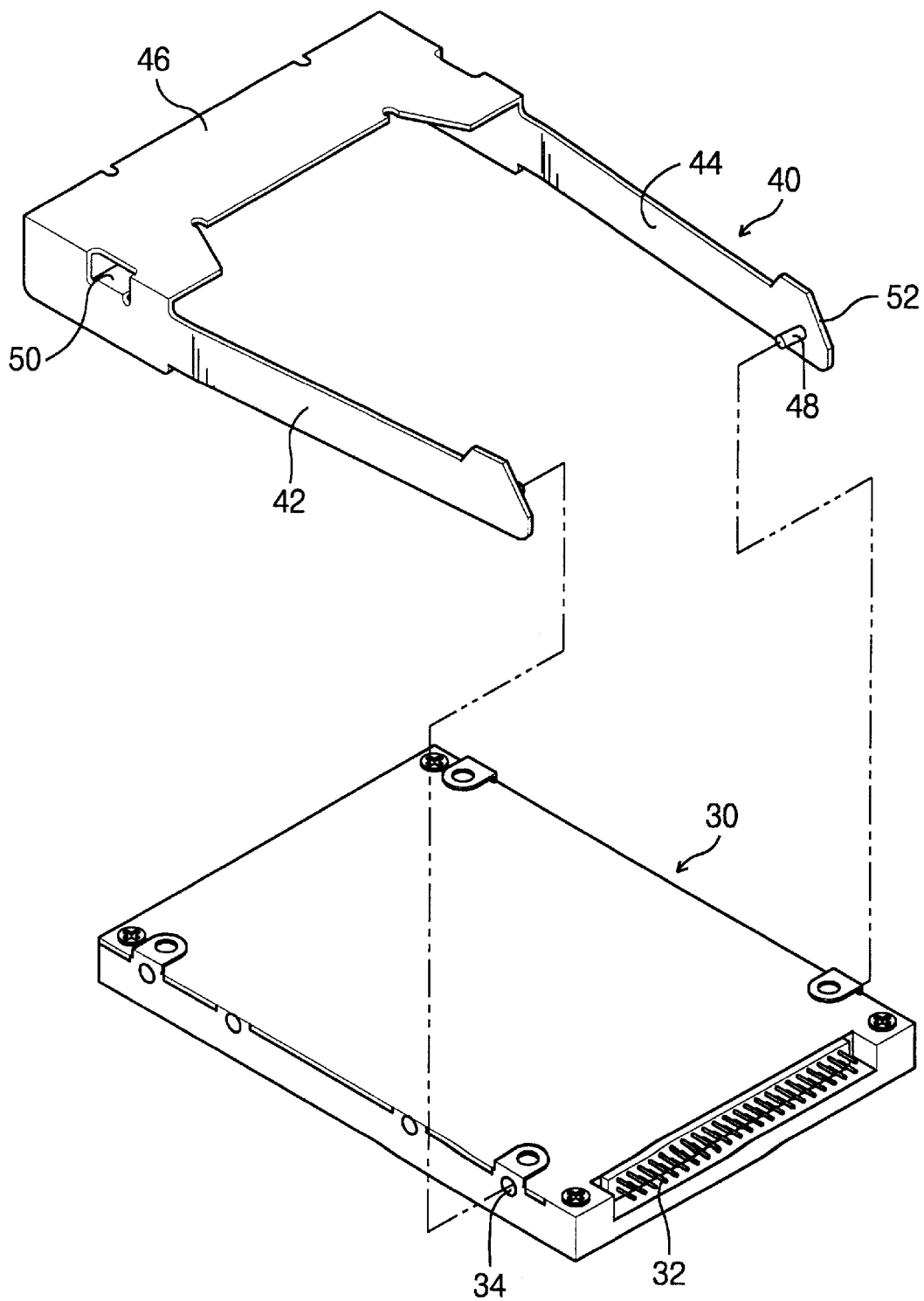
FIG. 5A is a perspective view illustrating the bracket and hard disk drive as shown in FIG. 3.
Figure 5B:
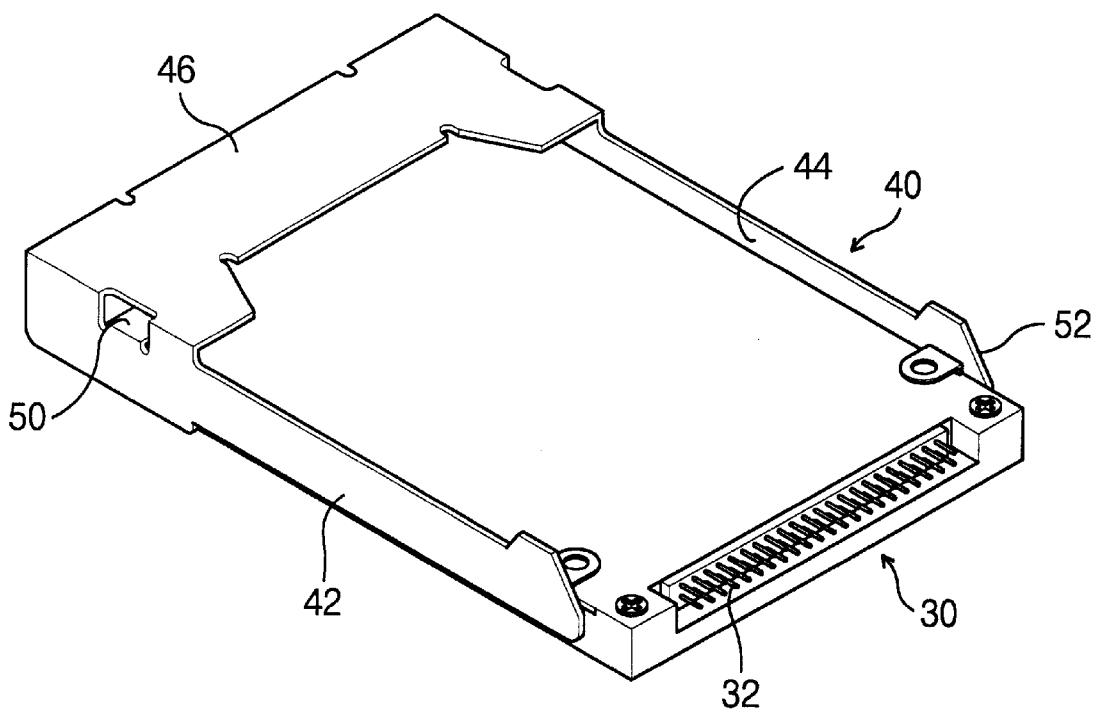
FIG. 5B is a perspective view illustrating the bracket attached to the hard disk drive in FIG. 5A.

Referring to FIGS. 4 to 5B, the hard disk drive 30 has a board connector 32 formed on the front and screw holes 34 symmetrically formed on two opposite sides thereof. The board connector 32 is engaged with the device connector 26a of the audio board 26 as shown in FIG. 3. The bracket 40 has two end parts and upper plate. One end part of the bracket 40 is pivotably connected to the hard disk drive 30, and the other end part held by the motherboard 24. Preferably, the other end part of the bracket 40 is designed to exceed the back of the hard disk drive 30. The upper plate of the bracket 40 is positioned parallel with the surface 20a of the keyboard seat 20 so as to be held by the detachable keyboard assembly 16 as shown in FIG. 3.

Describing more specifically the parts of the bracket 40, as shown in FIGS. 5A and 5B, the bracket 40 includes a pair of strips 42 and 44, upper plate 46, a pair of pins 48, protuberances 50, and cam parts 52. The strips 42 and 44 are to support the two opposite sides of the hard disk drive 30. The back ends of the strips 42 and 44 are supported by the motherboard 24, as shown in FIG. 6C. The upper plate 46 is formed by extending the other (back) end parts of the strips 42 and 44, and positioned parallel with the surface 20a of the keyboard seat 20 so as to be supported by the keyboard assembly 16, as shown in FIG. 6C. The pair of pins 48 are symmetrically formed on the free end parts of the strips 42 and 44 so as to be pivotably inserted into the corresponding screw holes 34 of the hard disk drive 30. The strips 42 and 44 are preferably and resiliently bent towards each other so as to tightly press both sides of the hard disk drive 30, thus fully inserting the pins 48 into the screw holes 34, as shown in FIG. 4. The protuberances 50 are preferably formed on the back end parts of the strips 42 and 44 to support the upper surface of the hard disk drive 30.

The cam parts 52 are formed on the free ends of the strips 42 and 44, serving to separate the hard disk drive 30 from the device connector 26a of the audio board 26. More specifically describing in connection with FIGS. 8A and 8B, the cam parts 52 are preferably designed so as to be pressed by the audio board to push the bracket 40 backwards when pivoting the bracket 40 by taking the upper plate 46 in the direction of detaching the hard disk drive 30. Thus, the hard disk drive 30 may be disconnected from the device connector 26a of the audio board. For example, the direction of pushing the bracket 40 is opposite to that of connecting the hard disk drive 30 to the device connector 26a of the audio board 26. In the present embodiment, although the other ends of the strips 42 and 44 are supported by the motherboard 24, and the cam parts 52 are supported by the audio board 26, other structures may be arranged in the housing so as to serve the support function of the boards. As described above, the structural characteristics include the hard disk drive mounting bracket being pivotably attached to the hard disk drive by means of a pair of pins so as to readily connect and disconnect the hard disk drive to and from the device connector, and in addition no fastening elements such as screws being required to fix the bracket in the housing.

Figure 6A:
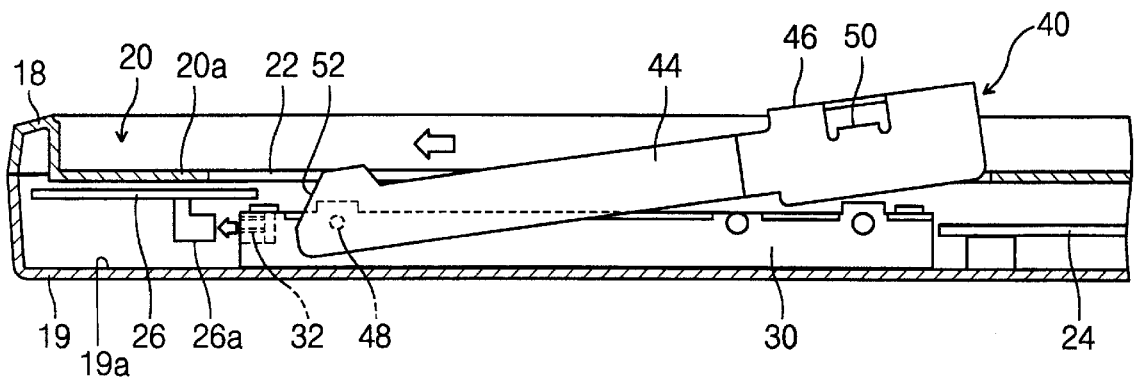
FIGS. 6A to 6C are cross-sectional views illustrating the steps of mounting the hard disk drive in the housing of a portable computer according to the present invention.
Figure 6B:
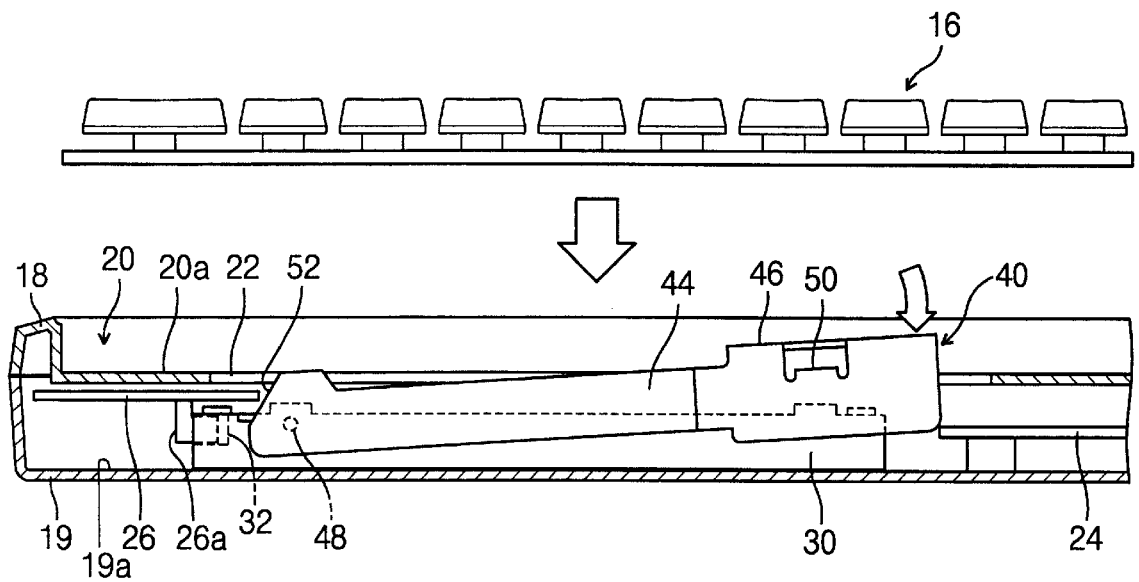
Figure 6C:
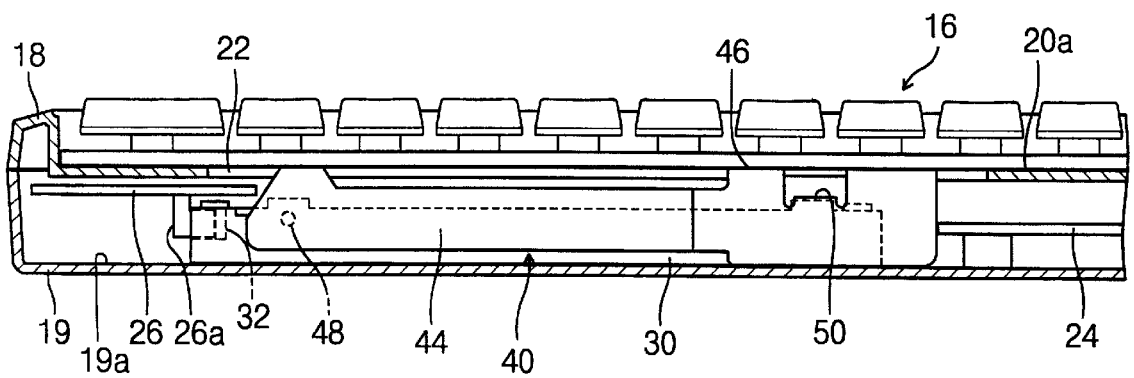
Figure 8A:
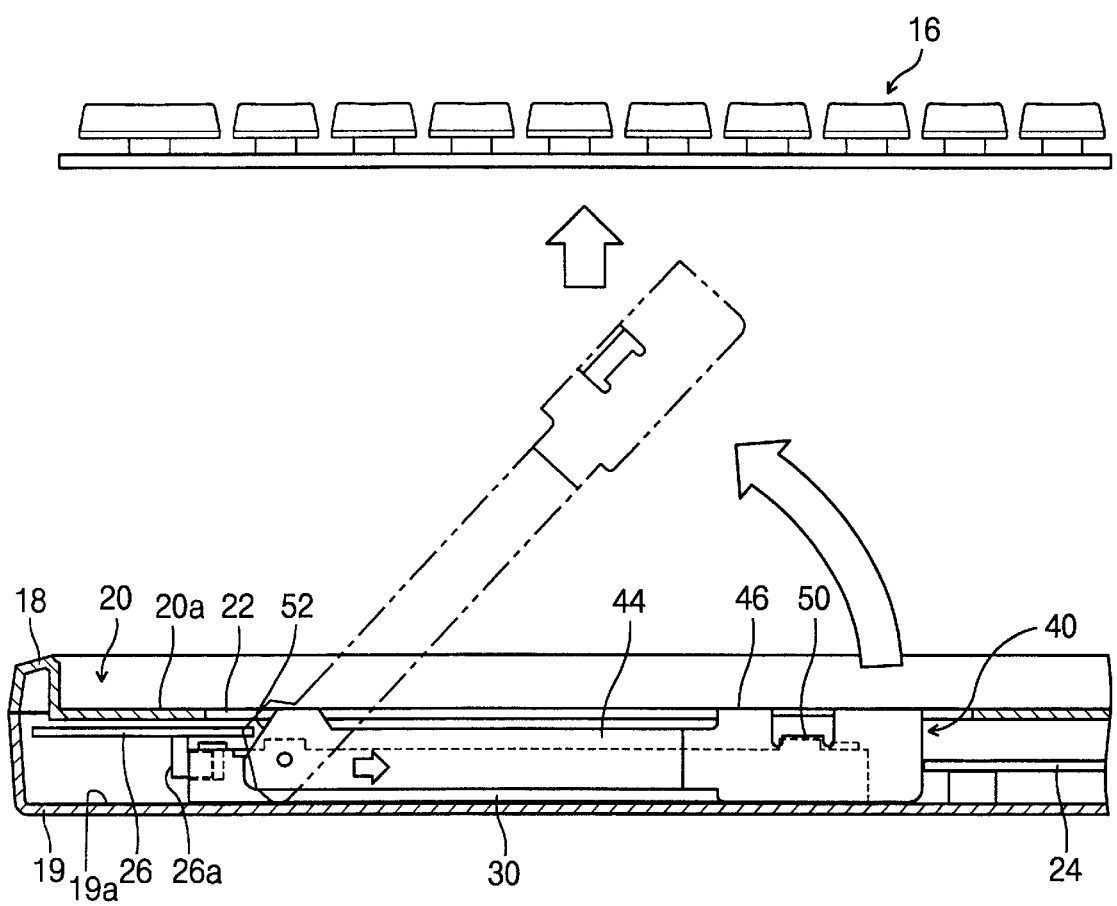
FIGS. 8A and 8B are cross-sectional views illustrating the operation of the bracket in order to detach the hard disk drive from the housing of a portable computer according to the present invention.
Figure 8B:
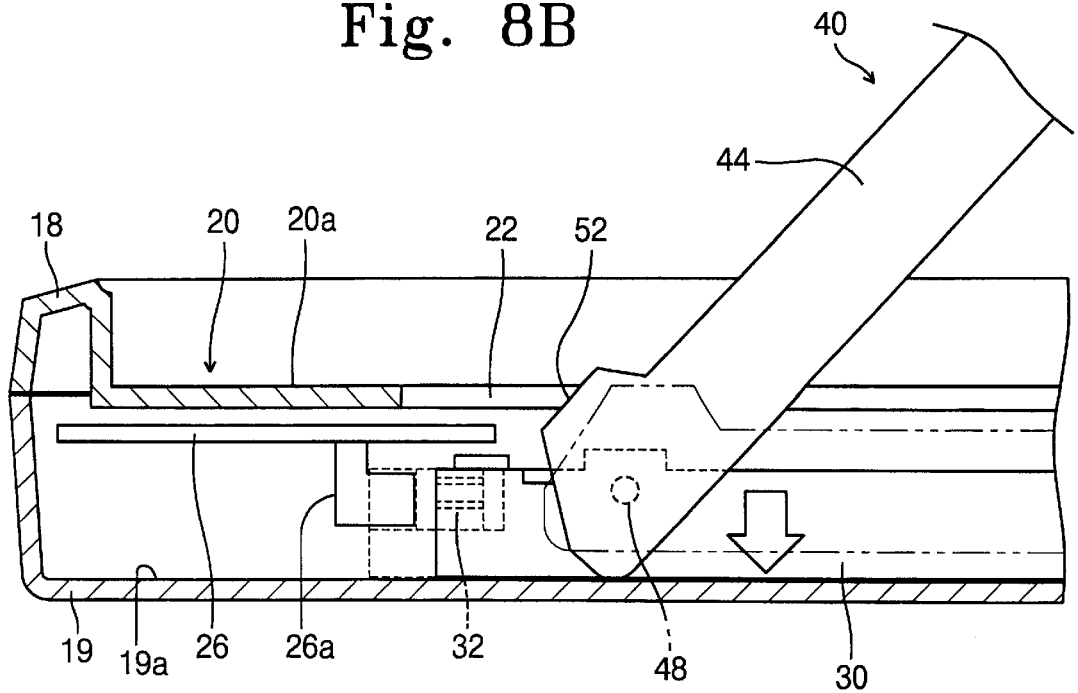

Describing the procedure of mounting the hard disk drive in the housing in connection with FIGS. 6A to 6C, the bracket 40 connected to the hard disk drive 30 is inserted through the opening 22 of the keyboard seat 20 into the housing, so that the hard disk drive 30 is placed on the bottom 19a of the bottom housing part 19. Then, pushing bracket 40 by taking the upper plate 46 towards the device connector 26a of the audio board 26, the hard disk drive 30 slides along the guide ribs 28 (see FIG. 7) formed on the bottom 19a until the board connector 32 of the hard disk drive 30 is engaged with the device connector 26a of the audio board 26, as shown in FIG. 6B. The other end (support plate) of the bracket 40 is pivoted towards the bottom 19a, supported by the motherboard 24. In this state, the upper plate 46 of the bracket 40 is positioned parallel with the surface 20a of the keyboard seat 20 through the opening 22, so that the upper plate 46 is pressed by the detachable keyboard assembly 16, as shown in FIG. 6C. This prevents the bracket 40 from moving upward when the portable computer is being carried. Of course, the bracket 40 is kept from moving backward by the motherboard 24 supporting the other end thereof Referring to FIGS. 8A and 8B, pivoting the bracket 40 by taking the upper plate 46 upward, the cam parts 52 on the free ends of the strips 42 and 44 are pushed by the audio board 26, so that the bracket 40 is moved backward to disconnect the hard disk drive 30 from the device connector 26a of the audio board as shown in FIGS. 8B and 8C. Thereafter, lifting the bracket 40 upward through the opening 22, the hard disk drive 30 is separated from the housing.

While the present invention has been described in connection with specific embodiments accompanied by the attached drawings, it will be readily appreciated by those skilled in the art that various changes and modifications may be made thereto without departing the gist of the present invention.

What is claimed is:

1. A portable computer provided with a structure for mounting an auxiliary device with a front having a board connector and two opposite sides having symmetrical screw holes, comprising:

a housing having a bottom, upper surface and internal space;

a printed circuit board (PCB) mounted on said bottom of said housing having a device connector for connecting to said auxiliary device;

a keyboard assembly detachably attached to said housing;

a keyboard seat formed on said upper surface of said housing to mount said keyboard assembly, said keyboard seat having an opening for enabling said auxiliary device to be mounted on said bottom in said internal space of said housing with said board connector being connected to said device connector; and a bracket having two end support parts and an upper support plate for fixedly attaching said auxiliary device to said bottom of said housing, one of said two end support parts being pivotably attached to the sides of said auxiliary device and the other end thereof being supported by an internal structure of said housing, and said upper support plate being positioned parallel to said keyboard seat so as to be held by said keyboard assembly;

said bracket comprising:

a pair of strips each having a free end for respectively supporting said two opposite sides of said auxiliary device;

a pair of pins respectively and symmetrically formed on the free ends of said strips so as to be pivotably inserted into the screw holes of said two opposite sides of said auxiliary device;

said upper support plate being formed by extending the other ends of said strips;

protuberances formed on said strips so as to support the upper surface of said auxiliary device; and a cam part formed on the free end of each of said strips to cause said bracket be pushed backwards by being pressed onto said PCB and thus separate the board connector of said auxiliary device from the device connector of said PCB upon said bracket being pivoted so as to detach said auxiliary device from said PCB.

2. A portable computer as defined in claim 1, said pair of strips being made of a resilient material for causing said pins to be tightly inserted into said screw holes.

3. A portable computer as defined in claim 1, said internal structure of said housing comprising either said PCB or a boss formed in said housing.

4. A structure for mounting an auxiliary device with a front having a connector and two opposite sides having symmetrical screw holes, comprising:

a housing having a bottom, upper surface and internal space;

a device connector mounted on said bottom of said housing for connecting to said auxiliary device;

a keyboard assembly detachably attached to said housing;

an opening formed on said upper surface of said housing for enabling said auxiliary device to be mounted on said bottom in said internal space of said housing with said connector being connected to said device connector; and a bracket having two end support parts and an upper support plate for fixedly attaching said auxiliary device to said bottom of said housing, one of said two end support parts being pivotably attached to the sides of said auxiliary device and the other end thereofbeing supported by an internal structure of said housing, and said upper support plate being positioned parallel to said upper surface; said bracket comprising:

a pair of strips each having a free end for respectively supporting said two opposite sides of said auxiliary device;

a pair of pins respectively and symmetrically formed on the free ends of said strips so as to be pivotably inserted into the screw holes of said two opposite sides of said auxiliary device;

said upper support plate being formed by extending the other ends of said strips;

protuberances formed on said strips so as to support the upper surface of said auxiliary device; and a cam part formed on the free end of each of said strips to cause said bracket be pushed backwards by being pressed onto said bottom of said housing and thus separate the connector of said auxiliary device from the device connector upon said bracket being pivoted so as to detach said auxiliary device.

5. A structure as defined in claim 4, said pair of strips being made of a resilient material for causing said pins to be tightly inserted into said screw holes.

6. A structure as defined in claim 4, said internal structure of said housing comprising either said bottom of said internal space or a boss formed in said housing.

* * * * *